US012770778B2

(12) United States Patent
Yoon et al.

(10) Patent No.: US 12,770,778 B2
(45) Date of Patent: Oct. 20, 2026

(54) COIL COMPONENT

(71) Applicant: SAMSUNG ELECTRO-MECHANICS CO., LTD., Suwon-si (KR)

(72) Inventors: Chan Yoon, Suwon-si (KR); Dong Hwan Lee, Suwon-si (KR); Dong Jin Lee, Suwon-si (KR); Boum Seock Kim, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 1023 days.

(21) Appl. No.: 17/890,611

(22) Filed: Aug. 18, 2022

(65) Prior Publication Data

US 2023/0114664 A1 Apr. 13, 2023

(30) Foreign Application Priority Data

Oct. 7, 2021 (KR) ........................ 10-2021-0133165

(51) Int. Cl.
*H01F 27/29* (2006.01)
*H01F 17/04* (2006.01)
(Continued)

(52) U.S. Cl.
CPC ......... *H01F 27/292* (2013.01); *H01F 17/045* (2013.01); *H01F 27/2852* (2013.01); *H01F 27/324* (2013.01); *H01F 2017/048* (2013.01)

(58) Field of Classification Search
CPC .. H01F 27/292; H01F 17/045; H01F 27/2852; H01F 27/324; H01F 2017/048
See application file for complete search history.

(56) References Cited

U.S. PATENT DOCUMENTS 10,818,426 B2 * 10/2020 Kim ...................... H01F 27/292
2006/0007640 A1 1/2006 Ishifune et al.
(Continued)

FOREIGN PATENT DOCUMENTS

CN 104916390 A * 9/2015 ........... H01F 41/041
CN 107799268 A 3/2018
(Continued)

OTHER PUBLICATIONS

Office Action issued in corresponding Korean Patent Application No. 10-2021-0133165 on Dec. 3, 2025, with English translation.
(Continued)

*Primary Examiner* — Malcolm Barnes
(74) *Attorney, Agent, or Firm* — MORGAN, LEWIS & BOCKIUS LLP

(57) ABSTRACT

A coil component includes a body having a first surface and a second surface opposing in a thickness direction, and a first side surface and a second side surface opposing in a width direction while each connecting the first surface and the second surface to each other. A coil unit is disposed in the body. First and second external electrodes are disposed to be spaced apart from each other on the body, while respectively being connected to the coil unit. A cover portion disposed on the second surface of the body and at least partially covering the first and second external electrodes. A cross-section perpendicular to the first surface of the body and parallel to the width direction and traversing the body and the cover portion has substantially the same size in the width direction and in the thickness direction.

19 Claims, 10 Drawing Sheets

I-I'

(51) Int. Cl.

| | |
|---|---|
| ***H01F 27/28*** | (2006.01) |
| ***H01F 27/32*** | (2006.01) |

(56) References Cited

U.S. PATENT DOCUMENTS

| | | | | |
|---|---|---|---|---|
| 2014/0049353 | A1* | 2/2014 | Yoon | H01F 27/292 336/227 |
| 2014/0062615 | A1* | 3/2014 | Yoo | H03H 7/427 333/185 |
| 2014/0362491 | A1* | 12/2014 | Adachi | C03C 3/064 264/611 |
| 2016/0012961 | A1* | 1/2016 | Suzuki | H01F 27/29 29/602.1 |
| 2016/0268038 | A1* | 9/2016 | Choi | H01F 27/255 |
| 2017/0256353 | A1 | 9/2017 | Park et al. | |
| 2017/0309388 | A1* | 10/2017 | Park | H01F 41/0233 |
| 2017/0352467 | A1 | 12/2017 | Kakiuchi et al. | |
| 2018/0047494 | A1 | 2/2018 | Yoon et al. | |
| 2018/0182537 | A1* | 6/2018 | Shimizu | H01F 27/29 |
| 2019/0198235 | A1 | 6/2019 | Yang et al. | |
| 2019/0259526 | A1 | 8/2019 | Cho et al. | |
| 2019/0259527 | A1* | 8/2019 | Yoon | H01F 3/00 |
| 2020/0118729 | A1* | 4/2020 | Lim | H01F 41/041 |
| 2020/0118733 | A1* | 4/2020 | Shimizu | H01F 27/2847 |
| 2020/0118737 | A1 | 4/2020 | Suzuki et al. | |
| 2020/0168387 | A1* | 5/2020 | Kim | H01F 17/0013 |
| 2020/0168391 | A1* | 5/2020 | Yang | H01F 17/0013 |
| 2020/0185148 | A1* | 6/2020 | Yoon | H01F 41/10 |
| 2020/0234874 | A1* | 7/2020 | Kato | H01F 27/292 |
| 2020/0321155 | A1* | 10/2020 | Park | H01F 17/0013 |

FOREIGN PATENT DOCUMENTS

| | | | | |
|---|---|---|---|---|
| JP | 2006-024712 | A | 1/2006 | |
| JP | 2017-528001 | A | 9/2017 | |
| JP | 2017-195361 | A | 10/2017 | |
| JP | 2017-216409 | A | 12/2017 | |
| JP | 2019-145778 | A | 8/2019 | |
| JP | 2020-061522 | A | 4/2020 | |
| JP | 2020-119979 | A | 8/2020 | |
| KR | 10-1548862 | B1 | 8/2015 | |
| KR | 10-2017-0032017 | A | 3/2017 | |
| KR | 10-2017-0088159 | A | 8/2017 | |
| KR | 10-2018-0017479 | A | 2/2018 | |
| KR | 10-2018-0025592 | A | 3/2018 | |
| KR | 20180025592 | A * | 3/2018 | H01F 17/0013 |
| KR | 10-2020-0117700 | A | 10/2020 | |
| WO | 2018/235539 | A1 | 12/2018 | |

OTHER PUBLICATIONS

Office Action issued in corresponding Japanese Patent Application No. 2022-129639 dated Jun. 30, 2026, with English translation.

* cited by examiner

COIL COMPONENT

CROSS-REFERENCE TO RELATED APPLICATION(S)

This application claims the benefit of priority to Korean Patent Application No. 10-2021-0133165 filed on Oct. 7, 2021 in the Korean Intellectual Property Office, the disclosure of which is incorporated herein by reference in its entirety.

TECHNICAL FIELD

The present disclosure relates to a coil component.

BACKGROUND

An inductor, one of coil components, is a typical passive electronic component used in an electronic device together with a resistor and a capacitor.

As electronic devices are increasingly improved in performance while their sizes become smaller, the number of electronic components used in the electronic devices has increased, and the sizes of the electronic components have decreased.

Meanwhile, there have been increasing demands for inductors of various sizes. In particular, there has been a demand for an inductor having a width W and a thickness T equal to each other in size.

SUMMARY

An aspect of the present disclosure may provide a coil component capable of simplifying a chip alignment process even in a case in which the coil component has a width W and a thickness T equal to each other in size.

Another aspect of the present disclosure may improve inductance characteristics of a coil component having a width W and a thickness T equal to each other in size.

According to an aspect of the present disclosure, a coil component may include: a body having a first surface and a second surface opposing in a thickness direction, and a first side surface and a second side surface opposing in a width direction while each connecting the first surface and the second surface to each other; a coil unit disposed in the body; first and second external electrodes disposed to be spaced apart from each other on the body, while respectively being connected to the coil unit; and a cover portion disposed on the second surface of the body and at least partially covering the first and second external electrodes, wherein a cross-section perpendicular to the first surface of the body and parallel to the width direction and traversing the body and the cover portion has substantially the same size in the width direction and in the thickness direction.

According to another aspect of the present disclosure, a coil component may include: a body having a first surface and a second surface opposing in a thickness direction, a first side surface and a second side surface opposing in a width direction while each connecting the first surface and the second surface to each other, and a first end surface and a second end surface opposing in a length direction while each connecting the first side surface and the second side surface to each other; a substrate disposed in the body; a coil unit disposed on the substrate; first and second external electrodes disposed to be spaced apart from each other on the first surface of the body, while respectively being connected to the coil unit; and a cover portion disposed on the second surface of the body, wherein a cross-section perpendicular to the length direction and traversing the body and the cover portion has substantially the same size in the width direction and in the thickness direction.

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Figure 1:
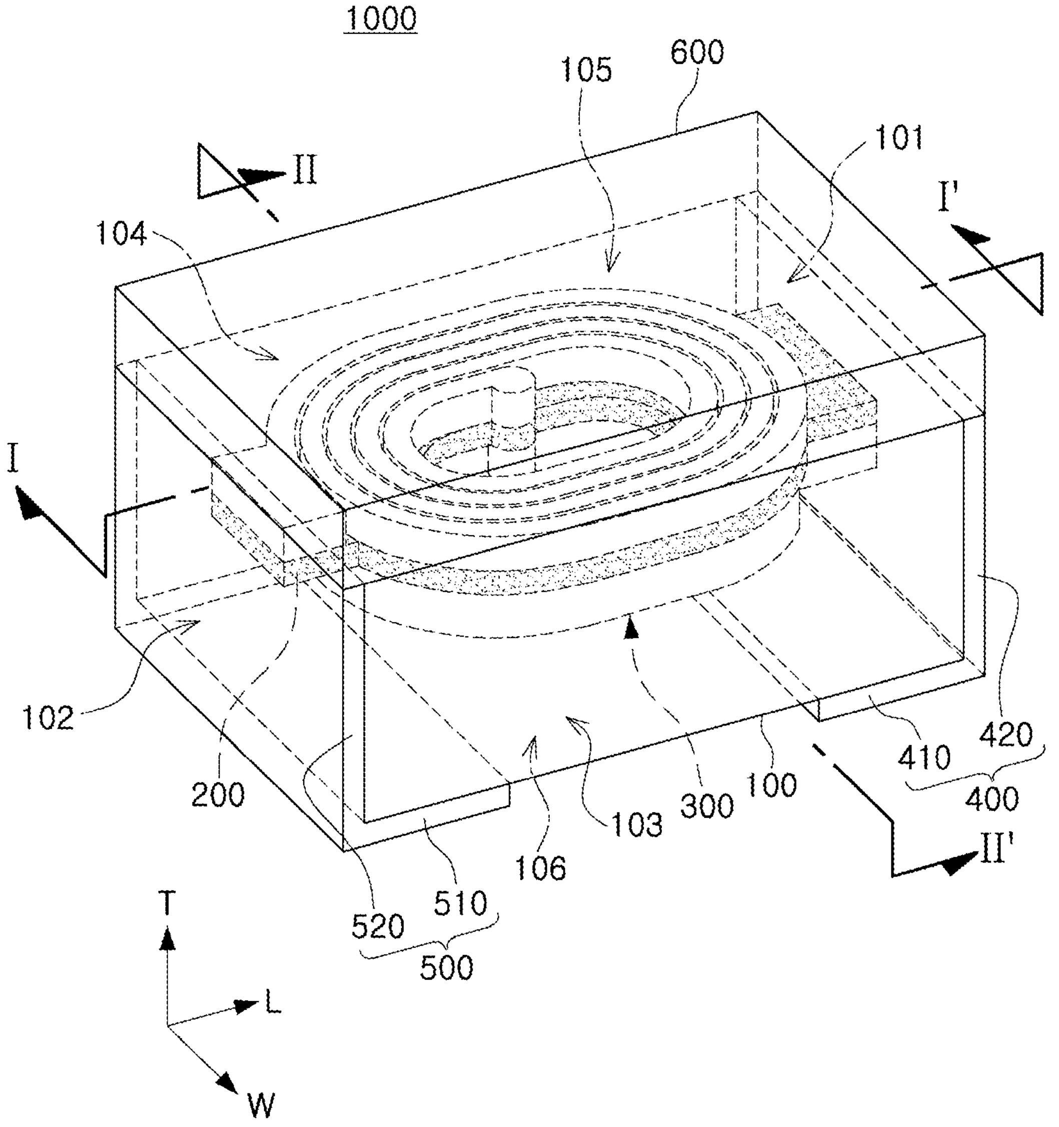
FIG. 1 is a schematic perspective view illustrating a coil component according to a first exemplary embodiment in the present disclosure.

Hereinafter, exemplary embodiments in the present disclosure will now be described in detail with reference to the accompanying drawings.

In the drawings, an L direction may be defined as a first direction or a length direction, a W direction may be defined as a second direction or a width direction, and a T direction may be defined as a third direction or a thickness direction.

Various types of electronic components may be used in electronic devices, and various types of coil components may be appropriately used between these electronic components to remove noise or for other purposes.

That is, in the electronic devices, the coil components may be used as power inductors, high frequency (HF) inductors, general beads, high frequency (GHz) beads, common mode filters, and the like.

First Exemplary Embodiment

Figure 2:
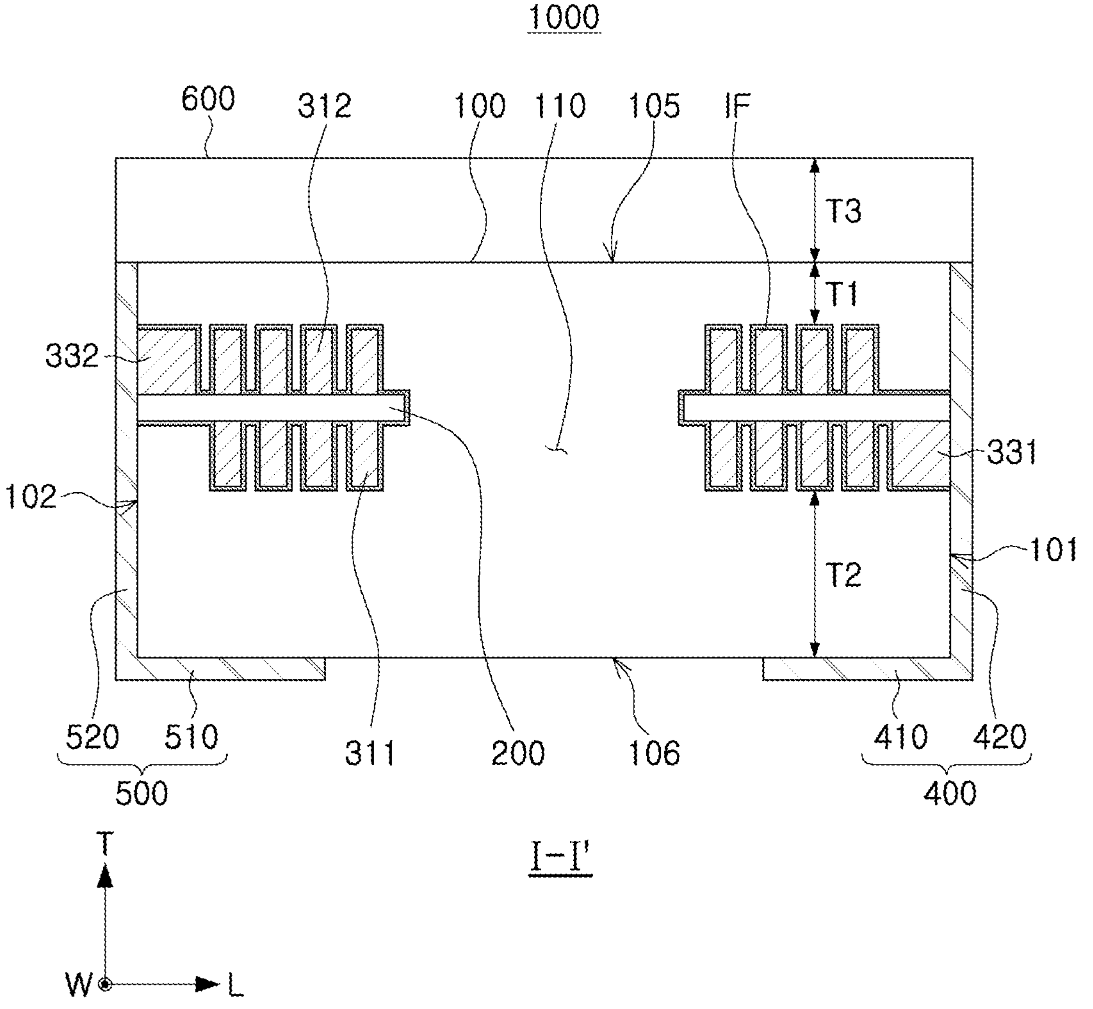
FIG. 2 is a cross-sectional view of FIG. 1 taken along line I-I'.
Figure 3:
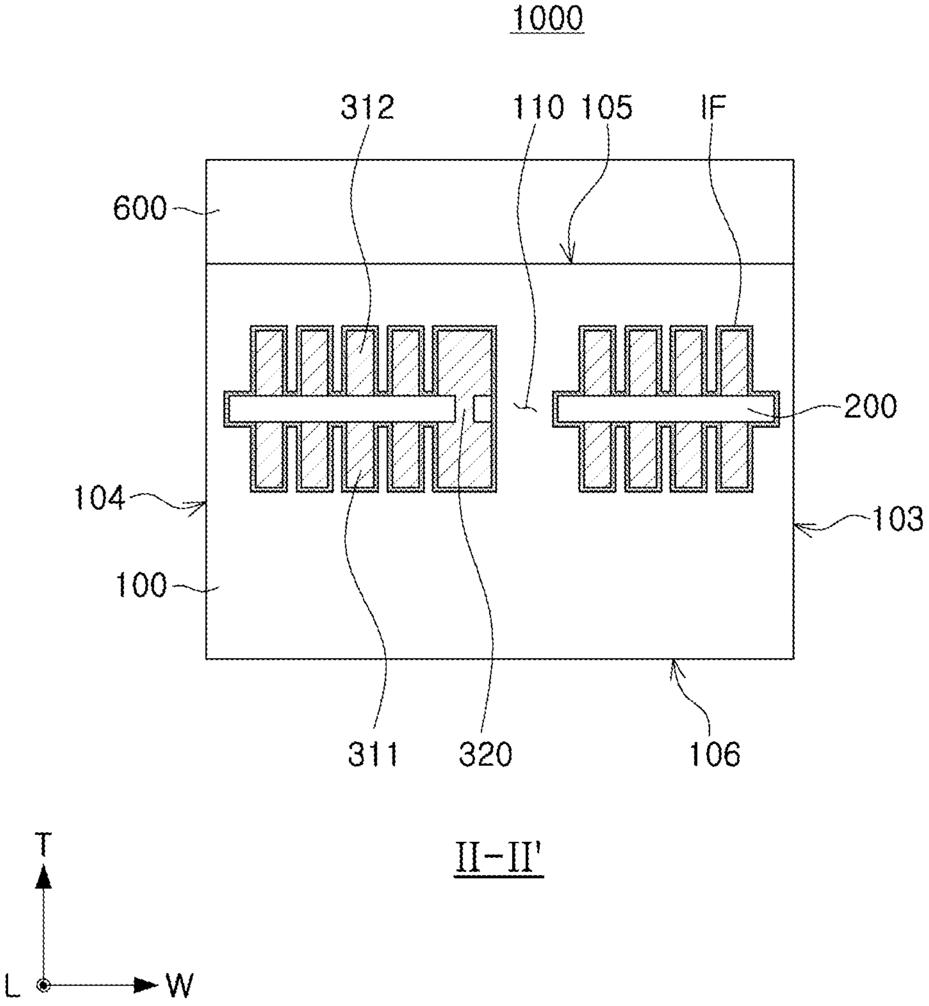
FIG. 3 is a cross-sectional view of FIG. 1 taken along line II-II'.
Figure 4A:
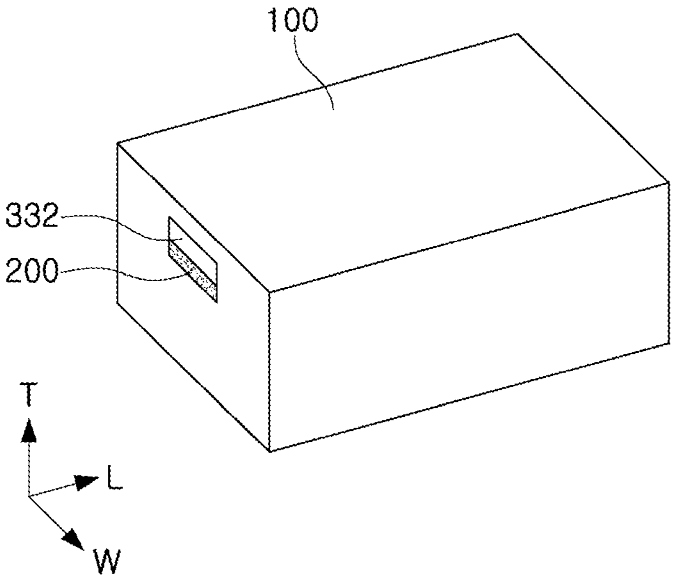
FIG. 4A is a schematic view illustrating a shape of the coil component 1000 according to the first exemplary embodiment in the present disclosure before external electrodes 400 and 500 are formed.
Figure 4B:
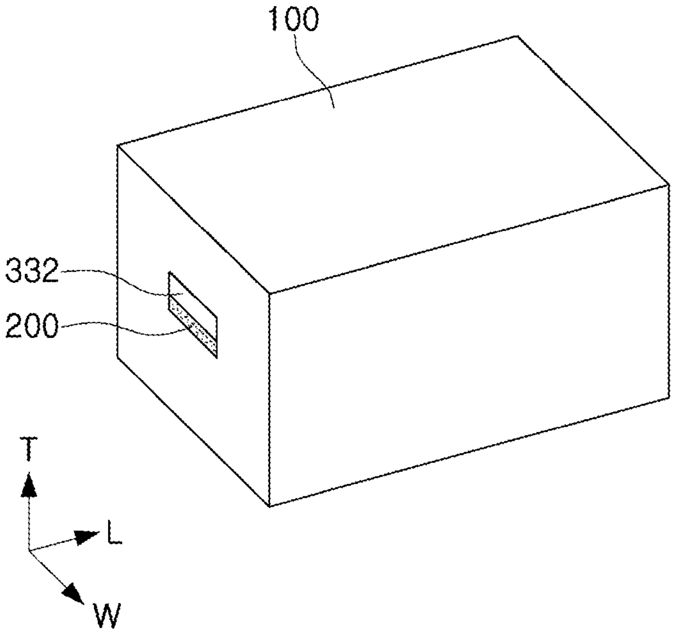
FIG. 4B is a schematic view illustrating a shape of a conventional coil component having a width W and a thickness T equal to each other in size before external electrodes are formed.
Figure 5:
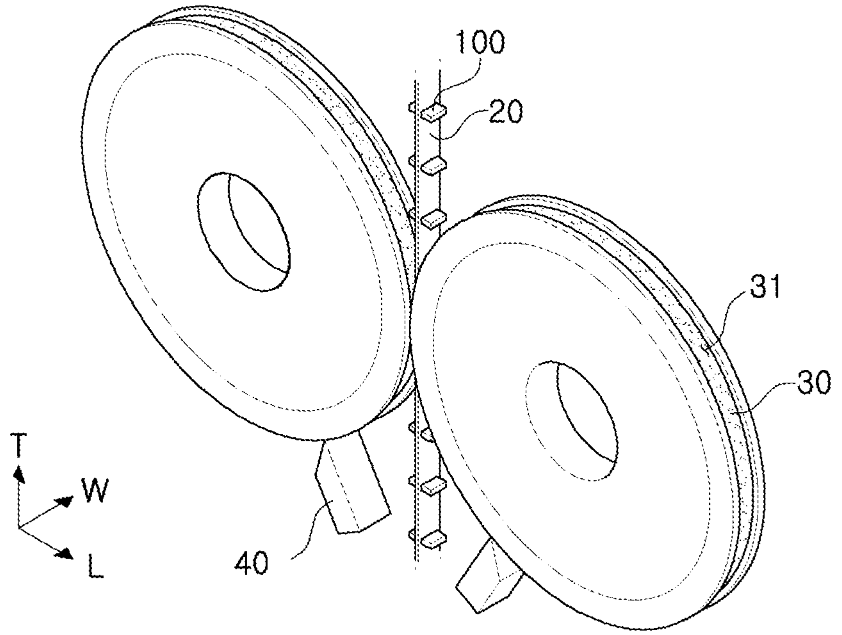
FIG. 5 is a schematic view illustrating an example of an external electrode application device.
Figure 6A:
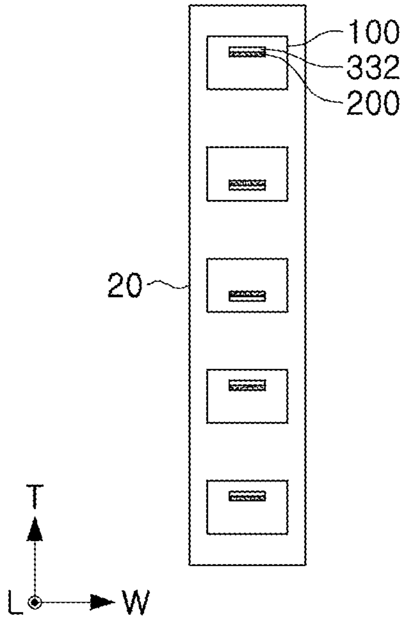
FIG. 6A is a view illustrating a case in which the coil components of FIG. 4A are mounted on carrier tape.
Figure 6B:
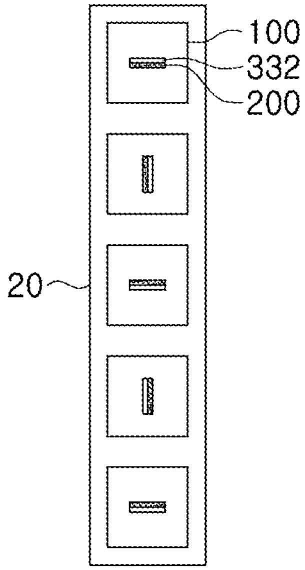
FIG. 6B is a view illustrating a case in which the coil components of FIG. 4B are mounted on carrier tape.

FIG. 1 is a schematic perspective view illustrating a coil component 1000 according to a first exemplary embodiment in the present disclosure. FIG. 2 is a cross-sectional view of FIG. 1 taken along line I-I'. FIG. 3 is a cross-sectional view of FIG. 1 taken along line II-II'. FIG. 4A is a schematic view illustrating a shape of the coil component 1000 according to the first exemplary embodiment in the present disclosure before external electrodes 400 and 500 are formed, and FIG. 4B is a schematic view illustrating a shape of a conventional coil component having a width W and a thickness T equal to each other in size before external electrodes are formed. FIG. 5 is a schematic view illustrating an example of an external electrode application device. FIG. 6A is a view illustrating a case in which the coil components 1000 of FIG. 4A are mounted on carrier tape, and FIG. 6B is a view illustrating a case in which the coil components of FIG. 4B are mounted on carrier tape.

Meanwhile, in order to more clearly illustrate connections between elemental constituents, an external insulating layer, which is applied to the present exemplary embodiment, on a body 100 is omitted in the drawings.

Referring to FIGS. 1 through 6, the coil component 1000 according to the first exemplary embodiment in the present disclosure may include a body 100, a substrate 200, a coil unit 300, first and second external electrodes 400 and 500, and a cover portion 600, and may further include an insulating film IF. In addition, the body 100 and the cover portion 600 may form a shape such that when taken as a whole, the cross-section perpendicular to the first surface of the body and parallel to a width direction and traversing the body and the cover portion has a substantially same size in the width and thickness directions.

The body 100 may form an exterior of the coil component 1000 according to the present exemplary embodiment, and the coil unit 300 and the substrate 200 may be disposed in the body 100.

The body 100 may generally have a hexahedral shape.

Based on the directions of FIGS. 1 through 3, the body 100 may have a first surface 101 and a second surface 102 opposing each other in the length direction L, a third surface 103 and a fourth surface 104 opposing each other in the width direction W, and a fifth surface 105 and a sixth surface 106 opposing each other in the thickness direction T. The first to fourth surfaces 101 to 104 of the body 100 may be wall surfaces of the body 100 that connect the fifth surface 105 and the sixth surface 106 of the body 100 to each other. Hereinafter, opposite end surfaces (one end surface and the other end surface) of the body 100 may refer to the first surface 101 and the second surface 102 of the body, respectively, opposite side surfaces (one side surface and the other side surface) of the body 100 may refer to the third surface 103 and the fourth surface 104 of the body, respectively, and one surface and the other surface of the body 100 may refer to the fifth surface 105 and the sixth surface 106 of the body 100, respectively.

The body 100 may be formed to have, for example, a length of 1.0 mm, a width of 0.7 mm, and a thickness of 0.58 mm, but the present disclosure is not limited thereto. Meanwhile, the coil component 1000 according to the present exemplary embodiment in which the external electrodes 400 and 500 and the cover portion 600 to be described below are formed may be formed to have a length of 1.06 mm, a width of 0.7 mm, and a thickness of 0.68 mm, but the present disclosure is not limited thereto. Meanwhile, the above-described numerical values are merely design values in which process errors and the like are not reflected. Thus, numerical values including process errors in an allowable range may be considered to fall within the scope of the present disclosure.

Based on a photograph of a cross section of the coil component 1000 in the length direction L-thickness direction T taken at a central portion thereof in the width direction W using an optical microscope or a scanning electron microscope (SEM), the above-mentioned length of the coil component 1000 may refer to a maximum value among dimensions of a plurality of line segments parallel to the length direction L, each connecting two outermost boundary lines opposing each other in the length direction L of the coil component 1000 illustrated in the photograph of the cross section thereof. Alternatively, the length of the coil component 1000 may refer to a minimum value among dimensions of a plurality of line segments parallel to the length direction L, each connecting two outermost boundary lines opposing each other in the length direction L of the coil component 1000 illustrated in the photograph of the cross section thereof. Alternatively, the length of the coil component 1000 may refer to an arithmetic mean value of at least three among dimensions of a plurality of line segments parallel to the length direction L, each connecting two outermost boundary lines opposing each other in the length direction L of the coil component 1000 illustrated in the photograph of the cross section thereof. Here, the plurality of line segments parallel to the length direction L may be equally spaced from each other in the thickness direction T, but the scope of the present disclosure is not limited thereto.

Based on a photograph of a cross section of the coil component 1000 in the length direction L-thickness direction T taken at a central portion thereof in the width direction W using an optical microscope or a scanning electron microscope (SEM), the above-mentioned thickness of the coil component 1000 may refer to a maximum value among dimensions of a plurality of line segments parallel to the thickness direction T, each connecting two outermost boundary lines opposing each other in the thickness direction T of the coil component 1000 illustrated in the photograph of the cross section thereof. Alternatively, the thickness of the coil component 1000 may refer to a minimum value among dimensions of a plurality of line segments parallel to the thickness direction T, each connecting two outermost boundary lines opposing each other in the thickness direction T of the coil component 1000 illustrated in the photograph of the cross section thereof. Alternatively, the thickness of the coil component 1000 may refer to an arithmetic mean value of at least three among dimensions of a plurality of line segments parallel to the thickness direction T, each connecting two outermost boundary lines opposing each other in the thickness direction T of the coil component 1000 illustrated in the photograph of the cross section thereof. Here, the plurality of line segments parallel to the thickness direction T may be equally spaced from each other in the length direction L, but the scope of the present disclosure is not limited thereto.

Based on a photograph of a cross section of the coil component 1000 in the length direction L-width direction W taken at a central portion thereof in the thickness direction T using an optical microscope or a scanning electron microscope (SEM), the above-mentioned width of the coil component 1000 may refer to a maximum value among dimensions of a plurality of line segments parallel to the width direction W, each connecting two outermost boundary lines opposing each other in the width direction W of the coil component 1000 illustrated in the photograph of the cross section thereof. Alternatively, the width of the coil component 1000 may refer to a minimum value among dimensions of a plurality of line segments parallel to the width direction W, each connecting two outermost boundary lines opposing each other in the width direction W of the coil component 1000 illustrated in the photograph of the cross section thereof. Alternatively, the width of the coil component 1000 may refer to an arithmetic mean value of at least three among dimensions of a plurality of line segments parallel to the width direction W, each connecting two outermost boundary lines opposing each other in the width direction W of the coil component 1000 illustrated in the photograph of the cross section thereof. Here, the plurality of line segments parallel to the width direction W may be equally spaced from each other in the length direction L, but the scope of the present disclosure is not limited thereto.

Alternatively, each of the length, width, and thickness of the coil component 1000 may be measured by a micrometer measurement method. In the micrometer measurement method, each of the length, width, and thickness of the coil component 1000 may be measured by setting a zero point using a micrometer having gage repeatability and reproducibility (R&R), inserting the coil component 1000 according to the present exemplary embodiment between tips of the micrometer, and turning a measurement lever of the micrometer. Meanwhile, concerning the measurement of the length of the coil component 1000 by the micrometer measurement method, the length of the coil component 1000 may refer to a value measured once, or may refer to an arithmetic mean of values measured multiple times. The same may also be applied to the width and the thickness of the coil component 1000.

The body 100 may include an insulating resin and a magnetic material. Specifically, the body 100 may be formed by stacking one or more magnetic composite sheets in which the magnetic material is dispersed in the insulating resin. The magnetic material may be ferrite or metal magnetic powder.

The ferrite may be, for example, one or more of spinel type ferrite such as Mg—Zn-based ferrite, Mn—Zn-based ferrite, Mn—Mg-based ferrite, Cu—Zn-based ferrite, Mg—Mn—Sr-based ferrite, or Ni—Zn-based ferrite, hexagonal ferrite such as Ba—Zn-based ferrite, Ba—Mg-based ferrite, Ba—Ni-based ferrite, Ba—Co-based ferrite, or Ba—Ni—Co-based ferrite, garnet type ferrite such as Y-based ferrite, and Li-based ferrite.

The metal magnetic powder may include one or more selected from the group consisting of iron (Fe), silicon (Si), chromium (Cr), cobalt (Co), molybdenum (Mo), aluminum (Al), niobium (Nb), copper (Cu), and nickel (Ni). For example, the metal magnetic powder may be one or more of pure iron powder, an Fe—Si-based alloy powder, an Fe—Si—Al-based alloy powder, an Fe—Ni-based alloy powder, an Fe—Ni—Mo-based alloy powder, an Fe—Ni—Mo—Cu-based alloy powder, an Fe—Co-based alloy powder, an Fe—Ni—Co-based alloy powder, an Fe—Cr-based alloy powder, an Fe—Cr—Si-based alloy powder, an Fe—Si—Cu—Nb-based alloy powder, an Fe—Ni—Cr-based alloy powder, and an Fe—Cr—Al-based alloy powder.

The metal magnetic powder may be amorphous or crystalline. For example, the metal magnetic powder may be an Fe—Si—B—Cr-based amorphous alloy powder, but the present disclosure is not limited thereto.

Each of the ferrite and the metal magnetic powder may have an average particle diameter of about 0.1 μm to 30 μm, but the present disclosure is not limited thereto.

The body 100 may include two or more types of magnetic materials dispersed in the resin. Here, the different types of magnetic materials mean that the magnetic materials dispersed in the resin are distinguished from each other in terms of any one of average particle diameter, composition, crystallinity, and shape.

Meanwhile, although the body 100 will be described hereinbelow on the premise that the magnetic material is magnetic metal powder, the scope of the present disclosure is not limited to the body 100 having a structure in which the magnetic metal powder is dispersed in the insulating resin.

The insulating resin may include an epoxy, a polyimide, a liquid crystal polymer (LCP), or a mixture thereof, but the present disclosure is not limited thereto.

The body 100 may include a core 110 penetrating through the substrate 200 and the coil unit 300 to be described below. The core 110 may be formed by filling a through-hole penetrating through a central portion of the coil unit 300 and the substrate 200 with the magnetic composite sheets, but the present disclosure is not limited thereto.

The substrate 200 may be disposed inside the body 100. The substrate 200 may be configured to support the coil unit 300 to be described below.

The substrate 200 may be formed of an insulating material including a thermosetting insulating resin such as an epoxy resin, a thermoplastic insulating resin such as a polyimide resin, or a photosensitive insulating resin, or may be formed of an insulating material in which a reinforcing material such as glass fibers or inorganic fillers is impregnated in such an insulating resin. As an example, the substrate 200 may be formed of an insulating material such as prepreg, an Ajinomoto build-up film (ABF), FR-4, a bismaleimide triazine (BT) resin, or a photo imageable dielectric (PID), but the present disclosure is not limited thereto.

The inorganic fillers may be formed using at least one selected from the group consisting of silica ($SiO_2$), alumina ($Al_2O_3$), silicon carbide (SiC), barium sulfate ($BaSO_4$), talc, clay, mica powder, aluminum hydroxide ($Al(OH)_3$), magnesium hydroxide ($Mg(OH)_2$), calcium carbonate ($CaCO_3$), magnesium carbonate ($MgCO_3$), magnesium oxide (MgO), boron nitride (BN), aluminum borate ($AlBO_3$), barium titanate ($BaTiO_3$), and calcium zirconate ($CaZrO_3$).

When the substrate 200 is formed of an insulating material including a reinforcing material, the substrate 200 may provide more excellent rigidity. When the substrate 200 is formed of an insulating material including no glass fibers, this may be advantageous in decreasing a thickness of the coil component 1000 according to the present exemplary embodiment. In addition, based on the body 100 of the same size, the substrate 200 formed of an insulating material including no glass fibers makes it possible to increase a volume occupied by the coil unit 300 and/or the magnetic metal powder, thereby improving component characteristics. When the substrate 200 is formed of an insulating material including a photosensitive insulating resin, the number of processes for forming the coil unit 300 may decrease, which is advantageous in decreasing a production cost and in forming a first via 320.

The substrate 200 may have a thickness of, for example, 10 μm or more and 50 μm or less, but the present disclosure is not limited thereto.

The coil unit 300 may be disposed inside the body 100 to exhibit characteristics of the coil component 1000. For example, when the coil component 1000 according to the present exemplary embodiment is utilized as a power inductor, the coil unit 300 may serve to stabilize power of an electronic device by storing an electric field as a magnetic field and maintaining an output voltage.

The coil component 1000 according to the present exemplary embodiment may include a coil unit 300 supported by the substrate 200 inside the body 100.

Referring to FIGS. 2 and 3, the coil unit 300 may include first and second coil patterns 311 and 312, a first via 320, and first and second lead-out portions 331 and 332. Specifically, based on the directions of FIGS. 1 through 3, the first coil pattern 311 and the first lead-out portion 331 may be disposed on a lower surface of the substrate 200 opposing the sixth surface 106 of the body 100, and the second coil pattern 312 and the second lead-out portion 332 may be disposed on an upper surface of the substrate 200 opposing the fifth surface 105 of the body 100.

Referring to FIGS. 1 through 3, the first via 320 may penetrate through the substrate 200 to be connected in contact with an inner end of each of the first coil pattern 311 and the second coil pattern 312. Here, in order to increase reliability in connection between the first via 320 and the inner end of each of the first and second coil patterns 311 and 312, via pads may be formed to increase areas of the coil patterns connected to the first via 320.

The first lead-out portion 331 may be connected to the first coil pattern 311 and exposed to the first surface 101 of the body 100, and may be connected to the first external electrode 400 to be described below.

That is, an input from the first external electrode 400 may be output through the second external electrode 500 after sequentially passing through the first lead-out portion 331, the first coil pattern 311, the first via 320, the second coil pattern 312, and the second lead-out portion 332.

By doing so, the coil unit 300 may function as a single coil as a whole between the first and second external electrodes 400 and 500.

Referring to FIGS. 1 through 3, each of the first coil pattern 311 and the second coil pattern 312 may have a planar spiral shape in which at least one turn is formed around the core 110. The first coil pattern 311 may form at least one turn around the core 110 on the lower surface of the substrate 200. The second coil pattern 312 may form at least one turn around the core 110 on the upper surface of the substrate 200.

The first and second lead-out portions 331 and 332 may be exposed to the first and second surfaces 101 and 102 of the body 100, respectively. Specifically, the first lead-out portion 331 may be exposed to the first surface 101 of the body 100, and the second lead-out portion 332 may be exposed to the second surface 102 of the body 100.

At least one of the first and second coil patterns 311 and 312, the first via 320, and the first and second lead-out portions 331 and 332 may include at least one conductive layer. For example, when the first coil pattern 311, the first via 320, and the first lead-out portion 331 are formed on the lower surface of the substrate 200 by plating, each of the first coil pattern 311, the first via 320, and the first lead-out portion 331 may include a seed layer and an electrolytic plating layer. Here, the electrolytic plating layer may have a single-layer structure or have a multilayer structure. The electrolytic plating layer having the multilayer structure may be formed in a conformal film structure in which one electrolytic plating layer is formed along a surface of another electrolytic plating layer, or may be formed by stacking one electrolytic plating layer on only one surface of another electrolytic plating layer. The seed layer may be formed by an electroless plating method, a vapor deposition method such as sputtering, or the like. The seed layers of the first coil pattern 311, the first via 320, and the first lead-out portion 331 may be integrally formed, such that no boundaries are formed therebetween, but are not limited thereto. The electrolytic plating layers of the first coil pattern 311, the first via 320, and the first lead-out portion 331 may be integrally formed, such that no boundaries are formed therebetween, but are not limited thereto.

Each of the first and second coil patterns 311 and 312, the first via 320, and the first and second lead-out portions 331 and 332 may be formed of a conductive material such as copper (Cu), aluminum (Al), silver (Ag), tin (Sn), gold (Au), nickel (Ni), lead (Pb), titanium (Ti), chromium (Cr), or an alloy thereof, but the present disclosure is not limited thereto.

The insulating film IF may be disposed between the coil unit 300 and the body 100 and between the substrate 200 and the body 100. The insulating film IF may be formed along the surfaces of the substrate 200 on which the first and second coil patterns 311 and 312 and the first and second lead-out portions 331 and 332 are formed, but the present disclosure is not limited thereto.

The insulating film IF may be provided to insulate the coil unit 300 and the body 100 from each other, and may include a known insulating material such as parylene, but the present disclosure is not limited thereto. As another example, the insulating film IF may include an insulating material such as an epoxy resin rather than parylene. The insulating film IF may be formed by a vapor deposition method, but the present disclosure is not limited thereto. As another example, the insulating film IF may be formed by stacking insulation films for forming the insulating film IF on both surfaces of the substrate 200 on which the coil unit 300 is formed and then curing the insulation films, or may be formed by applying an insulation paste for forming the insulating film IF onto both surfaces of the substrate 200 on which the coil unit 300 is formed and then curing the insulation paste. Meanwhile, the insulating film IF may be omitted in the present exemplary embodiment for the above-described reason. That is, if the body 100 has a sufficient electrical resistance at an operating current and voltage designed for the coil component 1000 according to the present exemplary embodiment, the insulating film IF may be omitted in the present exemplary embodiment.

The external electrodes 400 and 500 may be disposed to be spaced apart from each other on the body 100, while respectively being connected to the coil unit 300. Specifically, the first external electrode 400 may be disposed on the first surface 101 of the body 100 to be connected in contact with the first lead-out portion 331 that is exposed to the first surface 101 of the body 100, and the second external electrode 500 may be disposed on the second surface 102 of the body 100 to be connected in contact with the second lead-out portion 332 that is exposed to the second surface 102 of the body 100.

The first external electrode 400 may be disposed on the first surface 101 of the body 100 and extend to at least some of the third to sixth surfaces 103 to 106 of the body 100. The second external electrode 500 may be disposed on the second surface 102 of the body 100 and extend to at least some of the third to sixth surfaces 103 to 106 of the body 100.

The first external electrode 400 may include a first pad portion 410 disposed on the sixth surface 106 of the body 100, and a first connection portion 420 disposed on the first surface 101 of the body 100 to connect the first lead-out portion 331 and the first pad portion 410 to each other.

The second external electrode 500 may include a second pad portion 510 disposed to be spaced apart from the first pad portion 410 on the sixth surface 106 of the body 100, and a second connection portion 520 disposed on the second surface 102 of the body 100 to connect the second lead-out portion 332 and the second pad portion 510 to each other.

The first and second pad portions 410 and 510 and the first and second connection portions 420 and 520 may be formed together in the same process to be integrally formed without any boundaries formed therebetween, but the scope of the present disclosure is not limited thereto.

The external electrodes 400 and 500 may be formed by a vapor deposition method such as sputtering and/or a plating method, but are not limited thereto.

The external electrodes 400 and 500 may be formed of a conductive material such as copper (Cu), aluminum (Al), silver (Ag), tin (Sn), gold (Au), nickel (Ni), lead (Pb), chromium (Cr), titanium (Ti), or an alloy thereof, but are not limited thereto.

Each of the external electrodes 400 and 500 may be formed in a single-layer structure or in a multilayer structure. For example, each of the external electrodes 400 and 500 may include a first conductive layer including copper (Cu), a second conductive layer disposed on the first conductive layer and including nickel (Ni), and a third conductive layer disposed on the second conductive layer and including tin (Sn). At least one of the second conductive layer and the third conductive layer may be formed to cover the first conductive layer, but the scope of the present disclosure is not limited thereto. The first conductive layer may be a plating layer, or a conductive resin layer formed by applying and curing a conductive resin including a conductive powder containing at least one of copper (Cu) and silver (Ag) and a resin. The second and third conductive layers may be plating layers, but the scope of the present disclosure is not limited thereto.

The cover portion 600 may be disposed on the fifth surface 105 of the body 100, and may at least partially cover the first and second external electrodes 400 and 500. Specifically, since the cover portion 600 is disposed after the process of forming the first and second external electrodes 400 and 500, each of an upper side of the first connection portion 420 disposed on the first surface 101 of the body 100 and an upper side of the second connection portion 520 disposed on the second surface 102 of the body 100 may be at least partially covered by the cover portion 600 in the present exemplary embodiment.

The cover portion 600 may be in a form of a hexahedron having one surface contacting the fifth surface 105 of the body 100, the other surface opposing the one surface, opposite side surfaces opposing each other and connecting the one surface and the other surface to each other, and opposite end surfaces opposing each other and connecting the one surface and the other surface to each other.

In the coil component 1000 according to the present exemplary embodiment, the opposite side surfaces of the cover portion 600 may be coplanar with the opposite side surfaces 103 and 104 of the body, respectively. That is, the cover portion 600 and the body 100 may have a substantially equal width (dimension in the W direction).

Here, based on a photograph of a cross section of the coil component 1000 in the length direction L-width direction W taken at a central portion thereof in the thickness direction T using an optical microscope or a scanning electron microscope (SEM), the width of the cover portion 600 may refer to an arithmetic mean value of at least three among dimensions of a plurality of line segments parallel to the width direction W, each connecting two outermost boundary lines opposing each other in the width direction W of the cover portion 600 illustrated in the photograph of the cross section thereof. Here, the plurality of line segments parallel to the width direction W may be equally spaced from each other in the length direction L, but the scope of the present disclosure is not limited thereto.

Also, the opposite end surfaces of the cover portion 600 may be coplanar with the opposite end surfaces 101 and 102 of the body, respectively. That is, the cover portion 600 and the body 100 may have an equal length (dimension in the L direction).

Here, based on a photograph of a cross section of the coil component 1000 in the length direction L-thickness direction T taken at a central portion thereof in the width direction W using an optical microscope or a scanning electron microscope (SEM), the length of the cover portion 600 may refer to an arithmetic mean value of at least three among dimensions of a plurality of line segments parallel to the length direction L, each connecting two outermost boundary lines opposing each other in the length direction L of the cover portion 600 illustrated in the photograph of the cross section thereof. Here, the plurality of line segments parallel to the length direction L may be equally spaced from each other in the thickness direction T, but the scope of the present disclosure is not limited thereto.

A sum of a thickness T3 of the cover portion 600 and a mean shortest distance T1 between the insulating film IF on the second coil pattern 312 and the fifth surface 105 of the body 100 may be substantially equal to a mean shortest distance T2 between the insulating film IF on the first coil pattern 311 and the sixth surface 106 of the body 100. That is, the substrate 200 and the coil unit 300 may be located in a central region in the thickness direction (T direction) of the coil component 1000 in which the cover portion 600 is disposed.

Here, based on a photograph of a cross section of the coil component 1000 in the length direction L-thickness direction T taken at a central portion thereof in the width direction W using an optical microscope or a scanning electron microscope (SEM), the thickness T3 of the cover portion 600 may refer to an arithmetic mean value of at least three among dimensions of a plurality of line segments parallel to the thickness direction T, each connecting two outermost boundary lines opposing each other in the thickness direction T of the cover portion 600 illustrated in the photograph of the cross section thereof. Here, the plurality of line segments parallel to the thickness direction T may be equally spaced from each other in the length direction L, but the scope of the present disclosure is not limited thereto. Meanwhile, the mean shortest distances T1 and T2 between the insulating film IF and the surfaces of the body 100 may also be defined in the same manner as the thickness of the cover portion 600.

The cover portion 600 may include an insulating resin and a magnetic material. Specifically, the cover portion 600 may be formed by stacking one or more magnetic composite sheets in which the magnetic material is dispersed in the insulating resin. The magnetic material may be ferrite or metal magnetic powder.

The ferrite may be, for example, one or more of spinel type ferrite such as Mg—Zn-based ferrite, Mn—Zn-based ferrite, Mn—Mg-based ferrite, Cu—Zn-based ferrite, Mg—Mn—Sr-based ferrite, or Ni—Zn-based ferrite, hexagonal ferrite such as Ba—Zn-based ferrite, Ba—Mg-based ferrite, Ba—Ni-based ferrite, Ba—Co-based ferrite, or Ba—Ni—Co-based ferrite, garnet type ferrite such as Y-based ferrite, and Li-based ferrite.

The metal magnetic powder may include one or more selected from the group consisting of iron (Fe), silicon (Si), chromium (Cr), cobalt (Co), molybdenum (Mo), aluminum (Al), niobium (Nb), copper (Cu), and nickel (Ni). For example, the metal magnetic powder may be one or more of pure iron powder, an Fe—Si-based alloy powder, an Fe—Si—Al-based alloy powder, an Fe—Ni-based alloy powder, an Fe—Ni—Mo-based alloy powder, an Fe—Ni—Mo—Cu-based alloy powder, an Fe—Co-based alloy powder, an Fe—Ni—Co-based alloy powder, an Fe—Cr-based alloy powder, an Fe—Cr—Si-based alloy powder, an Fe—Si—Cu—Nb-based alloy powder, an Fe—Ni—Cr-based alloy powder, and an Fe—Cr—Al-based alloy powder.

The metal magnetic powder may be amorphous or crystalline. For example, the metal magnetic powder may be an Fe—Si—B—Cr-based amorphous alloy powder, but the present disclosure is not limited thereto.

Each of the ferrite and the metal magnetic powder may have an average particle diameter of about 0.1 μm to 30 μm, but the present disclosure is not limited thereto.

The cover portion 600 may include two or more types of magnetic materials dispersed in the resin. Here, the different types of magnetic materials mean that the magnetic materials dispersed in the resin are distinguished from each other in terms of any one of average particle diameter, composition, crystallinity, and shape.

The cover portion 600 may include a magnetic material of the same ingredient as the body 100. However, since the cover portion 600 and the body 100 are formed in different manufacturing processes, an interface may be formed in a region where the cover portion 600 and the fifth surface 105 of the body 100 contact each other. Specifically, an interface may be formed between the body 100 and the cover portion 600 because the cover portion 600 is formed after forming the coil unit 300 on the substrate 200, forming the body 100 by filling the magnetic material, and then disposing the external electrodes 400 and 500 on the body 100.

By means of the cover portion 600 described above, a W-T cross-section traversing the body 100 and the cover portion 600 may have substantially the same size along the width direction as the size along the thickness direction. That is, the W-T cross-section including the body 100 and the cover portion 600 may have a substantially square shape. Here, substantially the same means the same including process errors or positional deviations occurring during the manufacturing process, and errors during measurement. For example, in the coil component 1000 according to the present embodiment, the ratio of the thickness (the T-direction dimension) to the width (the W-direction dimension) may be about 1, and between 0.9 and 1.1, but the present disclosure is not limited thereto. Furthermore, the cover portion 600 may include the same type of magnetic material as the body 100, thereby increasing an effective volume of the coil component 1000, resulting in an improvement in inductance characteristics.

FIG. 4A is a schematic view illustrating a shape of the coil component 1000 according to the first exemplary embodiment in the present disclosure before the external electrodes 400 and 500 are formed, and FIG. 4B is a schematic view illustrating a shape of a conventional coil component having a width W and a thickness T equal to each other in size before external electrodes are formed.

Referring to FIG. 4A, the coil component 1000 according to the present exemplary embodiment may be asymmetric between a region above the substrate 200 and a region below the substrate 200 before the external electrodes 400 and 500 are formed. That is, 'the mean shortest distance T1 between the insulating film IF on the second coil pattern 312 and the fifth surface 105 of the body 100' and 'the mean shortest distance T2 between the insulating film IF on the first coil pattern 311 and the sixth surface 106 of the body 100' illustrated in FIG. 2 may be different from each other. Ultimately, before the external electrodes 400 and 500 are formed, the coil component 1000 has a rectangular shape based on its W-T cross section.

In contrast, referring to FIG. 4B, the conventional coil component having a width and a thickness equal to each other in size has a square shape based on its W-T cross section.

This difference of the coil component 1000 according to the present exemplary embodiment is advantageous in that a chip alignment process can be omitted among the subsequent processes.

FIG. 5 is a schematic view illustrating an example of an external electrode application device. FIG. 6A is a view illustrating a case in which the coil components of FIG. 4A are mounted on carrier tape, and FIG. 6B is a view illustrating a case in which the coil components of FIG. 4B are mounted on carrier tape.

Referring to FIG. 5, the external electrode application device may include paste wheels 30 and blades 40, and bodies 100 may be mounted in carrier tape 20 and supplied between the paste wheels 30. A recess portion 31 may be provided along a circumferential surface of each of the paste wheels 30. When the paste wheels 30 are rotated in a state where the recess portions 31 are filled with an external electrode paste, the external electrode paste may be applied onto outer surfaces of the body 100 contacting the recess portions 31.

Referring to FIG. 6, when the conventional coil components as illustrated in FIG. 4B are mounted in the carrier tape 20, the width and the thickness of the coil component may not be distinguished from each other because the coil component has a square shape, and thus, a separate chip alignment process may be required.

In contrast, since the body 100 of the coil component 1000 according to the present exemplary embodiment as illustrated in FIG. 4A has a rectangular shape, when the bodies 100 of the coil components 1000 according to the present exemplary embodiment are mounted in the carrier tape 20 after their width and thickness sizes are predetermined, a separate chip alignment process may be omitted.

The aforementioned difference of the coil component 1000 according to the present exemplary embodiment is advantageous in that a chip alignment process can be omitted among the processes before the cover portion 600 is disposed, while its width and thickness can be equal to each other in size by disposing the cover portion 600. That is, in various cases where chip alignment is required, for example, to dispose the coil unit 300 in a horizontal or vertical direction, to form external electrodes only on the bottom surface of the body, or to form a marker for identifying a turn direction of the coil unit 300, a separate chip alignment process can be omitted, thereby increasing productivity.

The coil component 1000 according to the present exemplary embodiment may further include an external insulating layer disposed on the third, fourth, and sixth surfaces 103, 104, and 106 of the body 100, and on five surfaces except for the one surface of the cover portion 600. The external insulating layer may be disposed in regions other than the regions where the external electrodes 400 and 500 are disposed.

At least partial portions of the external insulating layer disposed on the third, fourth, and sixth surfaces 103, 104, and 106 of the body 100, and on the five surfaces except for the one surface of the cover portion 600 may be formed in the same process to be integrally formed with no boundaries formed therebetween, but the scope of the present disclosure is not limited thereto.

The external insulating layer may be formed by forming an insulating material for forming the external insulating layer by a printing method, a vapor deposition method, a spray application method, a film lamination method, or the like, but the present disclosure is not limited thereto.

The external insulating layer may include a thermoplastic resin such as polystyrene, vinyl acetate, polyester, polyethylene, polypropylene, polyamide, rubber, or acryl, a thermosetting resin such as phenol, epoxy, urethane, melamine, or alkyd, a photosensitive resin, parylene, $SiO_x$, or $SiN_x$. The external insulating layer may further include insulating fillers such as inorganic fillers, but the present disclosure is not limited thereto.

Second Exemplary Embodiment

Figure 7:
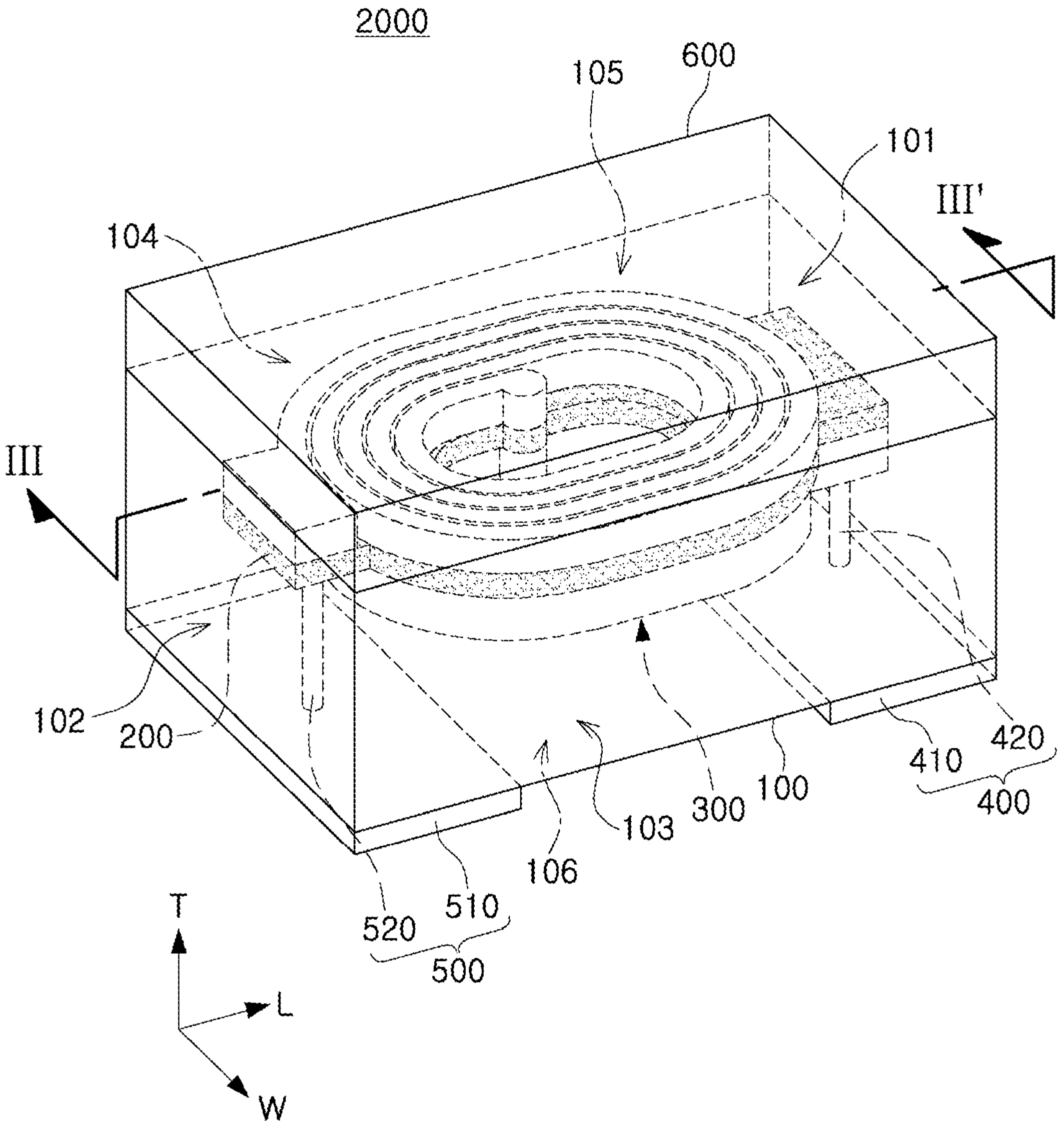
FIG. 7 is a schematic perspective view illustrating a coil component according to a second exemplary embodiment in the present disclosure.
Figure 8:
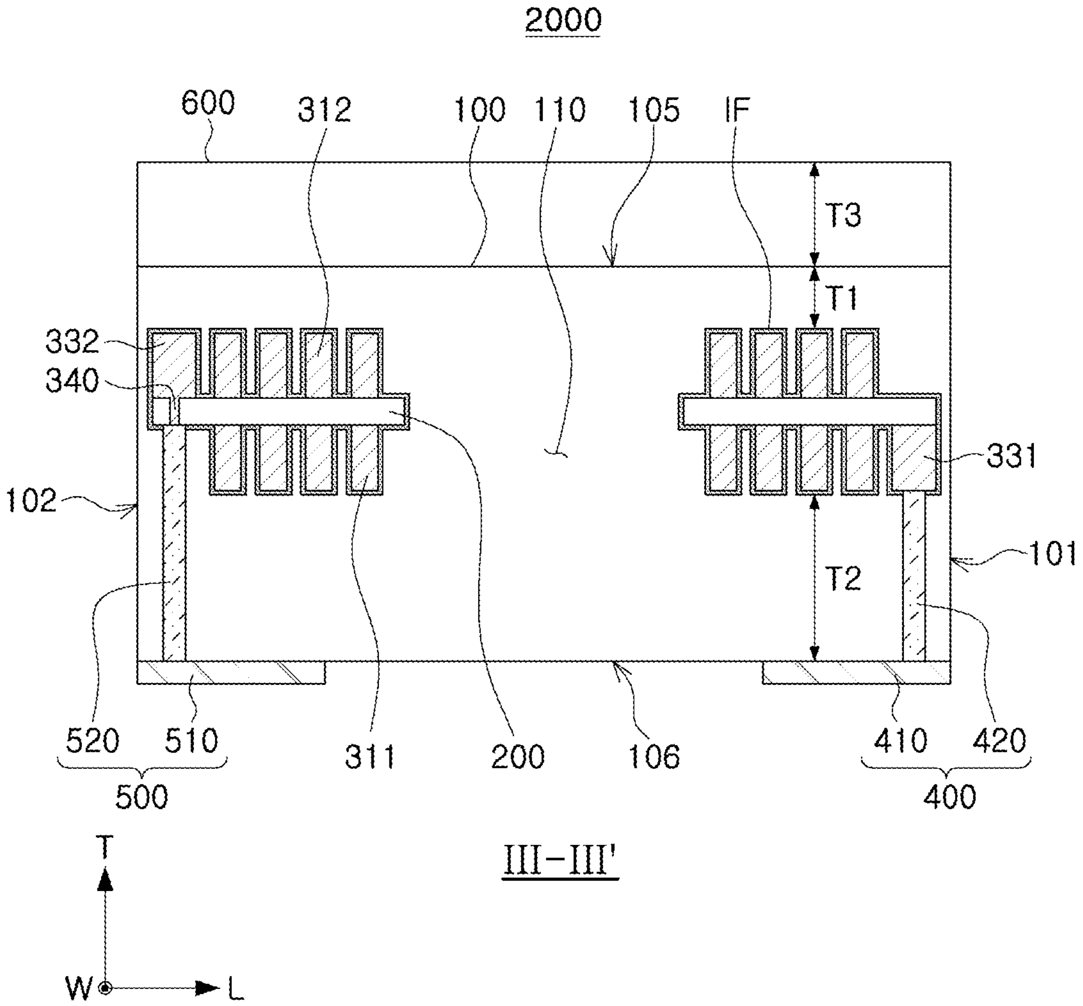
FIG. 8 is a cross-sectional view of FIG. 7 taken along line III-III'.
Figure 9:
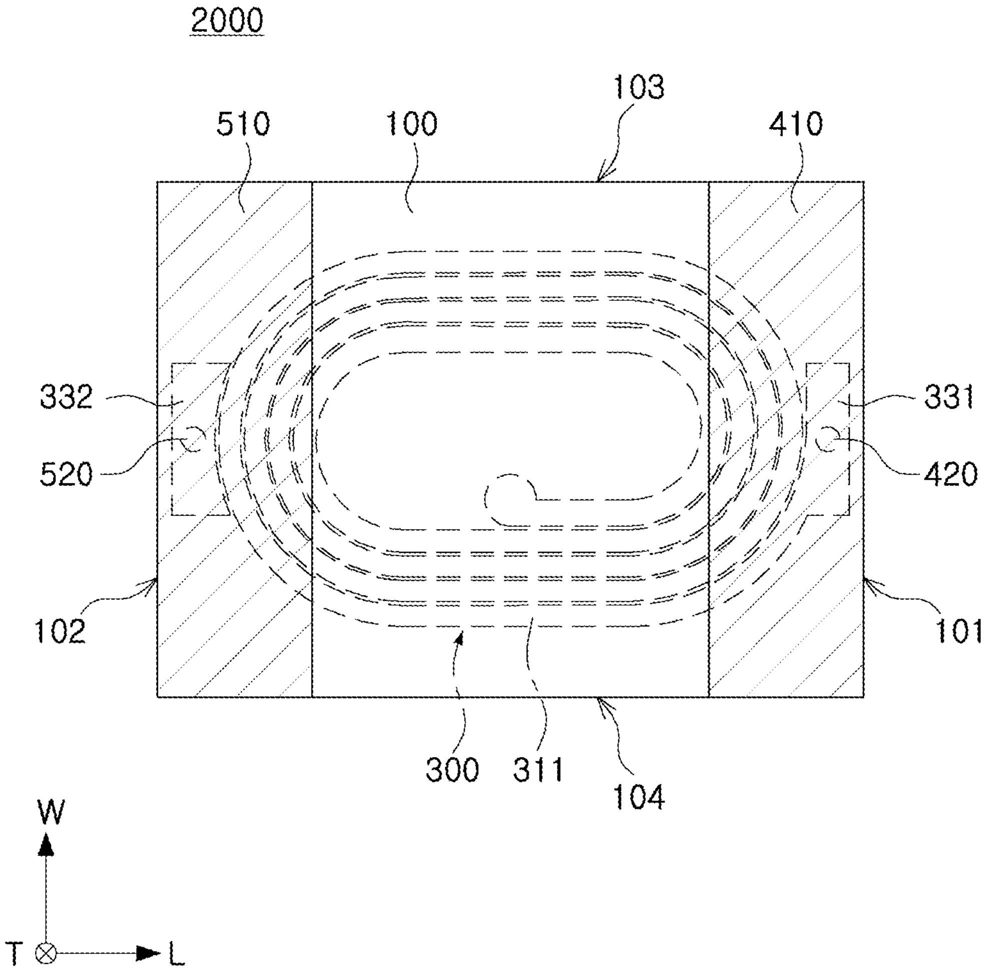
FIG. 9 is a bottom view of FIG. 7.

FIG. 7 is a schematic perspective view illustrating a coil component 2000 according to a second exemplary embodiment in the present disclosure. FIG. 8 is a cross-sectional view of FIG. 7 taken along line III-III'. FIG. 9 is a bottom view of FIG. 7.

Meanwhile, in order to more clearly illustrate connections between elemental constituents, an external insulating layer, which is applied to the present exemplary embodiment, on a body 100 is omitted in the drawings.

Referring to FIGS. 7 through 9, the coil component 2000 according to the second exemplary embodiment in the present disclosure is different from the coil component 1000 according to the first exemplary embodiment in the present disclosure in structures of external electrodes 400 and 500, a configuration of a second via 340, and surfaces on which an external insulating layer is disposed. Thus, in describing the present exemplary embodiment, only the structures of the external electrodes 400 and 500, the configuration of the second via 340, and the surfaces on which the external insulating layer is disposed, which are different from those in the first exemplary embodiment in the present disclosure, will be described. Concerning the other configuration of the present exemplary embodiment, what has been described above for the first exemplary embodiment in the present disclosure may be identically applied thereto.

In the coil component 2000 according to the present exemplary embodiment, the first and second external electrodes 400 and 500 may include first and second pad portions 410 and 510 and first and second connection portions 420 and 520 disposed to be spaced apart from each other on the sixth surface 106 of the body 100, respectively. Specifically, the first external electrode 400 may include a first pad portion 410 formed on the sixth surface 106 of the body 100, and a first connection portion 420 penetrating through at least a portion of the body 100 and connected in contact with each of the first lead-out portion 331 of the coil unit 300 and the first pad portion 410. The second external electrode 500 may include a second pad portion 510 formed on the sixth surface 106 of the body 100, and a second connection portion 520 penetrating through at least a portion of the body 100 and connected in contact with each of the second lead-out portion 332 of the coil unit 300 and the second pad portion 510.

Referring to FIG. 8, since the second lead-out portion 332 is disposed on the upper surface of the substrate 200, the coil unit 300 may further include a second via 340 penetrating through the substrate 200 to connect the second connection portion 520 and the second lead-out portion 332 to each other.

Each of the first and second pad portions 410 and 510 may be formed in a single-layer structure or in a multilayer structure. For example, the first pad portion 410 may include a first layer including copper (Cu), a second layer disposed on the first layer and including nickel (Ni), and a third layer disposed on the second layer and including tin (Sn).

Each of the first and second connection portions 420 and 520 may penetrate through at least a portion of the body 100. That is, in the coil component 2000 according to the present exemplary embodiment, the first and second pad portions 410 and 510 and the first and second lead-out portions 331 and 332 may be connected to each other through the first and second connection portions 420 and 520 disposed in the body 100, rather than connecting the first and second external electrodes 400 and 500 and the first and second lead-out portions 331 and 332 to each other through the surfaces of the body 100.

Referring to FIGS. 8 and 9, each of the first and second connection portions 420 and 520 may extend from the coil unit 300. For example, the first and second connection portions 420 and 520 may be formed by plating grown from the first and second lead-out portions 331 and 332 and the second via 340 exposed through openings of plating resists after the plating resists having the openings are formed on the first and second lead-out portions 331 and 332. Alternatively, each of the first and second connection portions 420 and 520 may be formed by processing the body 100 through the sixth surface 106 thereof for forming a via hole after the body 100 is formed, and filling the via hole with a conductive material. In the former case, the first and second lead-out portions 331 and 332 may function as power feeding layers at the time of forming the first and second connection portions 420 and 520 by electroplating, respectively. As a result, a separate seed layer such as an electroless plating layer may not exist at a boundary between each of the first and second connection portions 420 and 520 and the coil unit 300, but the formation of the first and second connection portions 420 and 520 is not limited thereto. In the latter case, each of the first and second connection portions 420 and 520 may include a seed layer formed on an inner surface of the via hole, but the present disclosure is not limited thereto.

Meanwhile, it is illustrated in FIGS. 7 through 9 that each of the first and second connection portions 420 and 520 is formed to have a cylinder shape in a single layer, but this is merely for convenience of illustration and description. As another non-limiting example, each of the first and second connection portions 420 and 520 may be formed to have a quadrangular prism shape in multiple layers.

The coil component 2000 according to the present exemplary embodiment may further include an external insulating layer disposed on the first to fourth and sixth surfaces 101 to 104 and 106 of the body 100, and on five surfaces except for the one surface of the cover portion 600. The external insulating layer may be disposed in regions other than the regions where the external electrodes 400 and 500 are disposed.

At least partial portions of the external insulating layer disposed on the first to fourth and sixth surfaces 101 to 104 and 106 of the body 100, and on the five surfaces except for the one surface of the cover portion 600 may be formed in the same process to be integrally formed with no boundaries formed therebetween, but the scope of the present disclosure is not limited thereto.

Third Exemplary Embodiment

Figure 10:
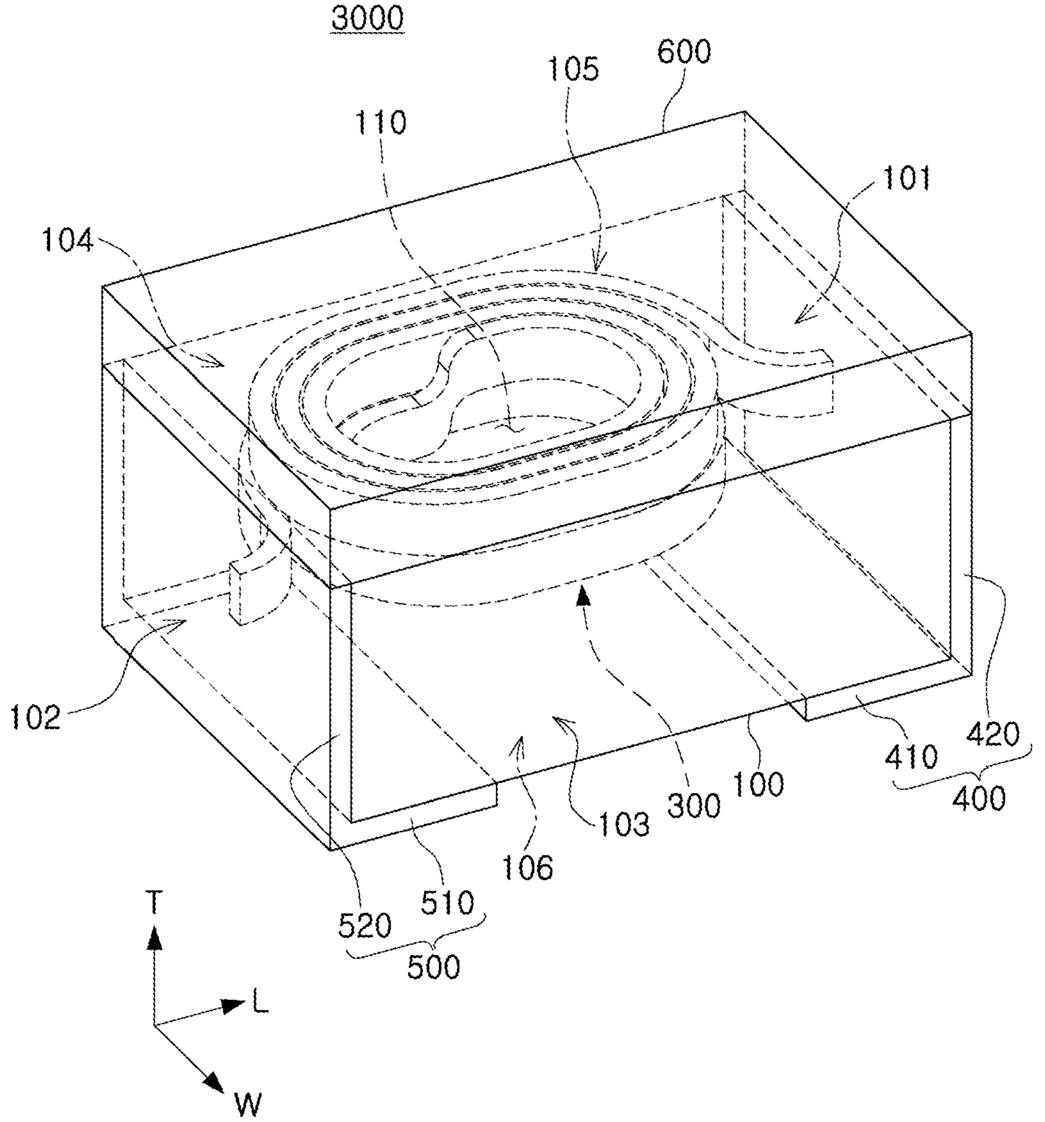
FIG. 10 is a schematic perspective view illustrating a coil component according to a third exemplary embodiment in the present disclosure.

FIG. 10 is a schematic perspective view illustrating a coil component 3000 according to a third exemplary embodiment in the present disclosure.

Referring to FIG. 10, the coil component 3000 according to the third exemplary embodiment in the present disclosure is different from the coil component 1000 according to the first exemplary embodiment in the present disclosure in the configuration of the coil unit 300 depending on whether the substrate 200 is present or absent. Thus, in describing the present exemplary embodiment, only the coil unit 300, which is different from that in the first exemplary embodiment in the present disclosure, will be described. Concerning the other configuration of the present exemplary embodiment, what has been described above for the first exemplary embodiment in the present disclosure may be identically applied thereto.

The coil component 3000 according to the present exemplary embodiment may include a wire-wound type coil unit 300. In this case, the substrate 200 is not included in the coil component 3000 according to the present exemplary embodiment.

The coil unit 300 may be a wire-wound coil formed by winding a metal wire such as a copper (Cu) wire of which a surface is coated with a coating layer. Therefore, an entire surface of each of a plurality of turns of the coil unit 300 may be coated with a coating layer.

Meanwhile, the metal wire may be a rectangular wire, but the present disclosure is not limited thereto. When the coil unit 300 is formed of a rectangular wire, each turn of the coil unit 300 may have a rectangular cross section.

The coating layer may include an epoxy, a polyimide, a liquid crystal polymer (LCP), or a mixture thereof, but the present disclosure is not limited thereto.

As set forth above, according to the exemplary embodiments in the present disclosure, even in a case when a coil component has a width W and a thickness T equal to each other in size, chips can be aligned in a simple manner without having to performing an additional process for distinguishing a width W direction and a thickness T direction from each other.

In addition, according to the exemplary embodiments in the present disclosure, it is possible to improve inductance characteristics of the coil component having a width W and a thickness T equal to each other in size.

While exemplary embodiments have been shown and described above, it will be apparent to those skilled in the art that modifications and variations could be made without departing from the scope of the present invention as defined by the appended claims.

What is claimed is:

1. A coil component comprising:

a body having a first surface and a second surface opposing in a thickness direction, and a first side surface and a second side surface opposing in a width direction while each connecting the first surface and the second surface to each other;

a coil unit disposed in the body;

first and second external electrodes disposed to be spaced apart from each other on the body, while respectively being connected to the coil unit;

a cover portion disposed on the second surface of the body and at least partially covering the first and second external electrodes; and a substrate disposed in the body;

wherein a cross-section perpendicular to the first surface of the body and parallel to the width direction and traversing the body and the cover portion has substantially the same size in the width direction and in the thickness direction, wherein the coil unit includes first and second coil patterns disposed on opposite surfaces of the substrate, respectively, a first via penetrating through the substrate to connect the first and second coil patterns to each other, and first and second lead-out portions connected to the first and second external electrodes, respectively, wherein the first external electrode includes a first pad portion disposed on the first surface of the body, and a first connection portion connecting the first lead-out portion and the first pad portion to each other, the second external electrode includes a second pad portion disposed on the first surface of the body, and a second connection portion connecting the second lead-out portion and the second pad portion to each other, and each of the first and second connection portions penetrates through inside of the body.

2. The coil component of claim 1, wherein the cover portion has a first cover surface contacting the second surface of the body, a second cover surface opposing the first cover surface, and opposite cover side surfaces opposing each other while each connecting the first cover surface and the second cover surface to each other, and the opposite cover side surfaces are coplanar with the opposite side surfaces of the body, respectively.

3. The coil component of claim 2, wherein the cover portion has opposite cover end surfaces each connecting the first cover surface and the second cover surface to each other and connecting the opposite cover side surfaces to each other, and the opposite cover end surfaces are coplanar with outer surfaces of the first and second pad portions, respectively.

4. The coil component of claim 1, wherein the cover portion includes a magnetic material of a same ingredient as the body.

5. The coil component of claim 4, wherein an interface is formed between the cover portion and the body.

6. The coil component of claim 1, further comprising an insulating film covering the coil unit and the substrate together, wherein the cover portion has a first cover surface contacting the second surface of the body, a second cover surface opposing the first cover surface, and wherein a mean shortest distance T2 between the insulating film and the first surface of the body is equal to a sum of a mean shortest distance T1 between the insulating film and the second surface of the body and a mean shortest distance T3 between the first cover surface and the second cover surface.

7. The coil component of claim 1, wherein the coil unit is a wire-wound type coil.

8. A coil component comprising:

a body having a first surface and a second surface opposing in a thickness direction, a first side surface and a second side surface opposing in a width direction while each connecting the first surface and the second surface to each other, and a first end surface and a second end surface opposing in a length direction while each connecting the first side surface and the second side surface to each other;

a substrate disposed in the body;

a coil unit disposed on the substrate;

first and second external electrodes disposed to be spaced apart from each other on the first surface of the body, while respectively being connected to the coil unit; and a cover portion disposed on the second surface of the body, wherein a cross-section perpendicular to the length direction and traversing the body and the cover portion has substantially the same size in the width direction and in the thickness direction, wherein the coil unit includes first and second coil patterns disposed on opposite surfaces of the substrate, respectively, a first via penetrating through the substrate to connect the first and second coil patterns to each other, and first and second lead-out portions connected to the first and second external electrodes, respectively, wherein the first external electrode includes a first pad portion disposed on the first surface of the body, and a first connection portion connecting the first lead-out portion and the first pad portion to each other, the second external electrode includes a second pad portion disposed on the first surface of the body, and a second connection portion connecting the second lead-out portion and the second pad portion to each other, and each of the first and second connection portions penetrates through the body.

9. The coil component of claim 8, wherein the cover portion has a first cover surface contacting the second surface of the body, a second cover surface opposing the first cover surface, and opposite cover side surfaces opposing each other while each connecting the first cover surface and the second cover surface to each other, and the opposite cover side surfaces of the cover portion are coplanar with the opposite side surfaces of the body, respectively.

10. The coil component of claim 9, wherein the cover portion has opposite cover end surfaces each connecting the first cover surface and the second cover surface to each other and connecting the opposite cover side surfaces to each other, and the opposite cover end surfaces are coplanar with the opposite end surfaces of the body, respectively.

11. The coil component of claim 8, wherein the cover portion includes a magnetic material of a same ingredient as the body.

12. The coil component of claim 11, wherein an interface is formed between the cover portion and the body.

13. The coil component of claim 8, further comprising an insulating film covering the coil unit and the substrate together, wherein the cover portion has a first cover surface contacting the second surface of the body, a second cover surface opposing the first cover surface, and wherein a mean shortest distance T2 between the insulating film and the first surface of the body is equal to a sum of a mean shortest distance T1 between the insulating film and the second surface of the body and a mean shortest distance T3 between the first cover surface and the second cover surface.

14. The coil component of claim 8, wherein the coil unit further includes a second via penetrating through the substrate to connect the second lead-out portion and the second connection portion to each other.

15. A coil component comprising:

a body having a first surface and a second surface opposing the first surface in a thickness direction;

a coil unit embedded in the body, the coil unit being disposed on a first substrate surface parallel to the first and second surfaces of the body;

a cover portion disposed on the second surface, the cover portion having a first cover surface contacting the second surface and a second cover surface opposing the first cover surface in the thickness direction; and an insulating film covering the coil unit, wherein a mean shortest distance T2 between the insulating film and the first surface of the body is equal to a sum of a mean shortest distance T1 between the insulating film and the second surface of the body and a mean shortest distance T3 between the first cover surface and the second cover surface.

16. The coil component of claim 15, wherein the cover portion and the body comprise a magnetic material, the magnetic material of the cover portion having a same ingredient as that of the body.

17. The coil component of claim 15, wherein the body and the cover portion form a substantially square cross section when taken as a whole.

18. The coil component of claim 15, wherein the coil unit comprises a first coil pattern disposed on the first substrate surface and a second coil pattern disposed on a second substrate surface opposing the first substrate surface in the thickness direction, and wherein the coil unit further comprises a first via penetrating the substrate and connecting the first and second coil patterns.

19. The coil component of claim 15, wherein the substrate comprises a through hole around which the coil unit is wound.

* * * * *